United States Patent [19]
Kojima et al.

[11] Patent Number: 5,223,120
[45] Date of Patent: Jun. 29, 1993

[54] METHOD FOR FABRICATING SOLID ELECTROLYTIC CAPACITORS USING AN ORGANIC CONDUCTIVE LAYER

[75] Inventors: Toshikuni Kojima, Zama; Masao Fukuyama, Kawasaki; Yasuo Kudoh, Yokohama; Norishige Nanai, Kanagawa, all of Japan

[73] Assignee: Matsushita Electric Industrial Co., Ltd., Osaka, Japan

[21] Appl. No.: 795,564

[22] Filed: Nov. 21, 1991

[30] Foreign Application Priority Data

Nov. 22, 1990 [JP] Japan .................. 2-318576
Nov. 30, 1990 [JP] Japan .................. 2-337942
Jul. 10, 1991 [JP] Japan .................. 3-169867

[51] Int. Cl.$^5$ .............................................. C25D 9/02
[52] U.S. Cl. .............................................. 205/317
[58] Field of Search ................................... 205/317

[56] References Cited

U.S. PATENT DOCUMENTS 4,929,316 5/1990 Harakawa .................. 205/317
5,017,272 5/1991 Kamigawa .................. 205/317

FOREIGN PATENT DOCUMENTS 58-17609 2/1983 Japan .
60-244017 12/1985 Japan .

Primary Examiner—T. M. Tufariello
Attorney, Agent, or Firm—Lowe, Price, LeBlanc & Becker

[57] ABSTRACT

A method for fabricating solid electrolytic capacitors which comprises providing a valve metal foil having a dielectric film and a conductive inorganic film formed on the valve metal foil in this order, contacting an electrode for electrolytic polymerization with part of the valve metal foil wherein the electrode is made of a material incapable of undergoing anodization in an electrolytic polymerization solution, subjecting the valve metal foil to electrolytic polymerization by application of a potential between the electrode and a counter electrode to form a conductive polymer film on the conductive inorganic film, and removing the electrode along with the contacted portion of the valve metal foil. At least one conductive paste film may be formed on the conductive polymer film prior to the removal of the electrode. In addition, an insulating film may be formed on an exposed portion of the valve metal foil after the removal of the electrode. A fabrication method of a capacitor unit having at least two capacitor elements is also described.

30 Claims, 11 Drawing Sheets

METHOD FOR FABRICATING SOLID ELECTROLYTIC CAPACITORS USING AN ORGANIC CONDUCTIVE LAYER

BACKGROUND OF THE INVENTION

1. Field of the Invention

This invention relates to a method for fabricating solid electrolytic capacitors wherein a conductive polymer layer is used as the solid electrolyte. The invention also relates to a method for fabricating a solid electrolytic capacitor of the integrated type wherein at least two capacitor elements are integrally combined together in one capacitor unit.

2. Description of the Prior Art

In recent trends toward digitalization of circuits of electric and electronic appliances, there is a strong demand of capacitors for the circuits which exhibit a low impedance in a high frequency range and are compact in size and large in capacitance.

Known high frequency capacitors include, for example, plastic film capacitors, mica capacitors, layer-built ceramic capacitors and the like. Among them, the film and mica capacitors are so large in size that a difficulty is involved in attaining a large capacitance. The layer-built ceramic capacitors have been developed in order to meet a demand for a large capacitance and a small size of the capacitors, but temperature characteristics become poor, coupled with another disadvantage that such capacitors become very expensive.

Aside from the above capacitors, there are known aluminium dry electrolytic capacitors, and aluminium or tantalum solid electrolytic capacitors.

With aluminium dry electrolytic capacitors, anode and cathode aluminium foils which have been etched, respectively, are convolutely wound through a paper separator, and a liquid electrolyte is impregnated in the separator. This type of capacitor has the serious problem that as time passes, the electrostatic capacitance is decreased along with an increase of the loss due to the leakage and/or evaporation of the liquid electrolyte and the ion conductivity and that the loss in a high frequency range and in a low temperature range is great. To avoid the above problem based on the use of liquid electrolytes, solid electrolytes are employed in the aluminium or tantalum solid electrolytic capacitors.

In the aluminium or tantalum solid electrolytic capacitors, a metallic foil such as an aluminium or tantalum foil which has been anodized to form a dielectric film on the surface thereof is immersed in a manganese nitrate aqueous solution. Then, the manganese nitrate is thermally decomposed at a temperature of approximately 350° C., thereby forming a solid electrolyte layer made of manganese dioxide. Since the electrolyte is solid in nature, the drawbacks, such as deterioration of characteristics involved by the evaporation of the liquid electrolyte at high temperatures or by coagulation of the electrolyte at low temperatures, can be avoided. These solid electrolytic capacitors exhibit better frequency and temperature characteristics than capacitors using liquid electrolytes. In addition, the dielectric film can be made very thin, thus being suitable for fabricating a capacitor with a large capacitance.

In addition, there are known other types of solid electrolytic capacitors which make use of organic semiconductors such as 7,7,8,8-tetracyanoquinodimethane (TCNQ) complexes instead of the manganese dioxide layer as disclosed in Japanese Laid-open Patent Application No. 58-17609 and conductive polymers obtained by electrolytic polymerization of polymerizable monomers such as pyrrole, furan and the like as set forth in Japanese Laid-open Patent Application No. 60-244017.

The solid electrolytic capacitors using the manganese dioxide layer as the solid electrolyte are disadvantageous in that the dielectric film will be damaged during several cycles of thermal decomposition treatments. Additionally, the specific resistance of the manganese dioxide layer is so high that the loss (tan $\delta$) in a high frequency range is not satisfactory.

Although the capacitors using the organic semiconductors such as TCNQ complexes have better high frequency characteristics than those capacitors using manganese dioxide but have the problem that the specific resistance is increased at the time of application of the organic semiconductor and that the adhesion of the semiconductor to an anodized metallic foil is not so high. Thus, such capacitors are not satisfactory with respect to characteristic properties.

On the other hand, the capacitors using an electrolytically polymerized material such as of pyrrole, furan or derivatives thereof as the solid electrolyte layer exhibit good frequency and temperature characteristics and a long life, thus being expected as promising.

However, this type of solid electrolytic capacitor has is not satisfactory with respect to leakage current. The reason for this is considered as follows.

For the formation of a conductive polymer layer on the dielectric film, an electrode for initiating the polymerization, which is, for example, a metal electrode having a needle-shaped tip, is contacted with the valve metal from outside. By the contact, the dielectric film is almost invariably damaged. In addition, the contact of the electrode for the initiation of the polymerization from outside makes an undesirably large-sized fabrication apparatus as a whole.

In order to prevent the dielectric film from being damaged, there may be a process wherein a conductive polymer thin film is formed on a valve metal foil, on which a dielectric film has been formed on the surface thereof, by chemical polymerization. Thereafter, part of the conductive polymer thin film is cut off to expose the the valve metal foil. The exposed portion is used as a positive electrode for initiating electrolytic polymerization. However, the exposed portion used as the positive electrode is anodized during electrolytic polymerization and is electrically insulated. Thus, the electric current rarely passes on the way of the formation of the polymer film. This formation of the polymer film becomes very slow. In the worst case, the polymerization reaction will stop.

Further, when it is desired to obtain a capacitor having a very large capacitance, it is usual to build up capacitor elements obtained after completion of the electrolytic polymerization. This eventually leads to a large-size capacitor with a lowering of yield.

SUMMARY OF THE INVENTION

It is therefore an object of the present invention to provide an improved method for fabricating a solid electrolytic capacitor wherein an electrolytic polymerization reaction is carried out at high speed without damaging the dielectric film, thereby obtaining a solid electrolytic capacitor with a reduced leakage current.

It is another object of the invention to provide a method for fabricating a solid electrolytic capacitor which makes use of an electrolytically polymerized film as a solid electrolyte formed by electrolytic polymerization and which is small in size but large in capacitance.

It is a further object of the invention to provide a method for fabricating a solid electrolytic capacitor of an integrated type wherein at least two capacitor elements are integrally formed in one capacitor unit, so that a very high capacitance is reliably attained in the small-size capacitor unit without building up capacitor elements by a usual manner.

The above objects of the invention can be achieved, according to one embodiment of the invention, by a method for fabricating a solid electrolytic capacitor of the type which comprises a valve metal foil capable of forming a dielectric oxide film thereon, a dielectric oxide film formed on the valve metal foil except for a portion serving as an electrode for the capacitor, a conductive inorganic film formed on the dielectric oxide film, a conductive polymer film formed on the conductive inorganic layer by electrolytic polymerization, and leads formed on the valve metal foil and the conductive polymer film, respectively, the method comprising:

providing a valve metal foil having a dielectric film and a conductive inorganic film formed thereon in this order except for a portion of the valve metal foil serving as an electrode for the capacitor;

contacting an electrode for electrolytic polymerization with part of the valve metal foil wherein the electrode is made of a material incapable of undergoing anodization in an electrolytic polymerization solution;

subjecting the valve metal foil to electrolytic polymerization of a polymerizable compound in an electrolytic solution by application of a polymerization potential between the electrode for electrolytic polymerization and a counter electrode placed in the electrolytic solution in a spaced relation with the electrode for electrolytic polymerization until a conductive polymer layer serving as a solid electrolyte is formed on the conductive inorganic film; and removing the electrode for the electrolytic polymerization from the valve metal foil and attaching leads to the electrode portion of the valve metal foil and the conductive polymer layer, respectively.

The capacitor may be covered with a resin except for the leads.

The electrode for electrolytic polymerization may be contacted with the part of the valve metal foil by welding of a foil of a non-anodizable metal such as Ni. Alternatively, the part of the valve metal foil may be exposed by breakage, after which a metal piece or a conductive material is applied to the exposed portion to form the electrode. For this purpose, the valve metal foil is preferably provided with a tab portion. The tab portion which is covered with the dielectric film and the inorganic conductive layer and on which the electrode is mounted is removed to expose the valve metal foil at the removed portion.

Preferably, after removal of the electrode for electrolytic polymerization, an insulating film is formed over the removed portion in order to avoid short-circuiting between the exposed valve metal foil after removal of the electrode and the conductive polymer film. In addition, a conductive cured paste film of a carbon and/or silver paste may be further formed on the conductive polymer film as an electrode for the capacitor by a usual manner.

According to another embodiment of the invention, there is also provided a method for fabricating a solid electrolytic capacitor unit of the type which comprises at least two capacitor elements integrally combined together through a conductive polymer, each capacitor element including a valve metal foil capable of forming a dielectric oxide film thereon, a dielectric oxide film formed on the valve metal foil for except for a portion serving as an electrode for the capacitor, a conductive inorgainc film formed on the dielectric oxide film, a conductive polymer film formed on the conductive inorganic film by electrolytic polymerization, and leads formed on the valve metal foils which are electrically connected each other through the electrode portions thereof and the conductive polymer film, the method comprising;

providing at least two valve metal foils, each having a dielectric film and a conductive inorganic layer formed thereon in this order;

contacting an electrode for electrolytic polymerization with part of at least one valve metal foil while electrically connecting at least two valve metal foils in a spaced relation to each other wherein the electrode is made of a material incapable of undergoing anodization in an electrolytic polymerization solution;

subjecting the at least two valve metal foils to electrolytic polymerization of a polymerizable compound in an electrolytic solution by application of a polymerization potential between the electrode for electrolytic polymerization and a counter electrode placed in the electrolytic solution in a spaced relation with the electrode for electrolytic polymerization until a conductive polymer layer serving as a solid electrolyte is formed on the conductive inorganic layer of each valve metal foil; and removing the electrode for the electrolytic polymerization from the valve metal foil and the electric connection between the at least two valve metal foils and attaching leads to one of the at least two valve metal foils which are electrically connected through the electrode portions thereof and the conductive polymer layer, respectively.

Preferably, the at least two valve metal foils are fixedly set in a spaced relation when electrically connected. Tot his end, the at least two valve metal foils are connected with a suitable member of material incapable of undergoing anodization. In order to keep the spaced relation, it is preferred to place a separator between the at least two valve metal foils. In this embodiment, after removal of the electrode, the removed portion of each capacitor element is preferably covered with an insulating material.

BRIEF DESCRIPTION OF THE DRAWINGS

FIGS. 1 to 10 are, respectively, schematic views illustrating a fabrication process of a solid electrolytic capacitor according to one embodiment of the invention wherein FIG. 5 is a sectional view taken along line A—A' of FIG. 4;

FIGS. 11 to 18 are, respectively, schematic views illustrating a fabrication process according to another embodiment of the invention wherein FIGS. 12a to 17a and FIGS. 11 and 12b to 17b are, respectively, side views, partially in section, and plan views;

FIGS. 19 to 22 are, respectively, schematic views illustrating a fabrication process according to a further embodiment of the invention wherein FIGS. 19a to 22a and FIGS. 19b to 22b are, respectively, side views, partially in section, and plan views;

FIGS. 23 to 26 are, respectively, schematic views illustrating a fabrication process according to a still further embodiment of the invention wherein FIGS. 23a to 26a and FIGS. 23b to 25b and 26 are, respectively, side views, partially in section, and plan views;

FIGS. 27 to 30 are, respectively, schematic views illustrating a fabrication process according to still another embodiment of the invention wherein FIGS. 27a to 29a and FIGS. 27b to 29b and 30 are, respectively, side views, partially in section, and plan views; and FIGS. 31 to 33 are, respectively, schematic views illustrating a fabrication process of a solid electrolytic capacitor of an integrated type, wherein at least two capacitor elements are integrally combined in one capacitor unit, according to another embodiment of the invention wherein FIGS. 31a to 32a are plan views, FIG. 33 is a side view, partially in section, of the capacitor unit.

DETAILED DESCRIPTION AND EMBODIMENTS OF THE INVENTION

Figure 1A:
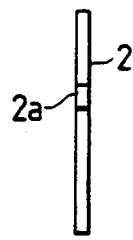
FIGS. 1a, 2a, 3a, 4a, 6a, 7a, 8a and 9a and FIGS. 1b, 2b, 3b, 4b, 6b, 7b, 8b and 9b are, respectively, side views, partially in section, and plan views.

Reference is now made to the accompanying drawings wherein like reference numerals indicate like parts or members and particularly, to FIGS. 1 to 10 showing one embodiment of the invention.

First, a fundamental structure having one capacitor element is described with reference to FIG. 10.

Figure 10:
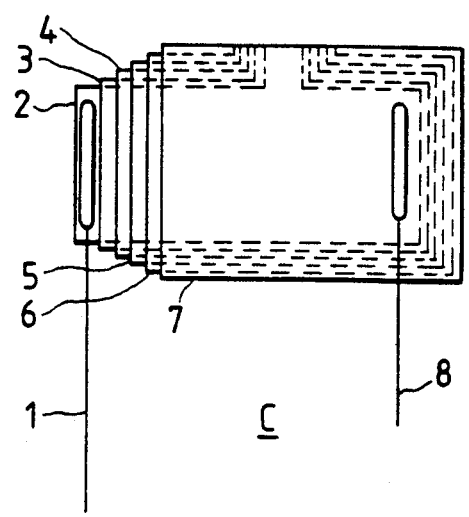

FIG. 10 shows a solid electrolytic capacitor C. The capacitor C includes a valve metal foil 2, such as an aluminium foil or a tantalum foil, having a lead 1 for positive electrode for the capacitor. This foil 2 is usually etched by any known procedure to increase the surface area. The etched foil 2 has a dielectric film 3 and an inorganic conductive film 4 on the surface except for a portion serving as a positive electrode. The inorganic conductive film 4 is usually made of manganese dioxide. Further, a conductive polymer film 5 is formed on the conductive inorganic film 4. A lead 8 for negative electrode may be directly formed on the conductive polymer film 5. Usually, a cured carbon paste film 6 and/or a cured silver paste film used as a conductive cured paste layer P is formed on the conductive polymer film 5 as shown in the figure. The layer P may be made of the cured silver paste film 7 alone which serves as a negative electrode. On the conductive cured paste film is formed the lead 8 for the negative electrode to complete the capacitor C. If necessary, a resin may be used to cover the capacitor C.

The fabrication process of the capacitor C according to one embodiment of the invention is described.

Figure 1B:
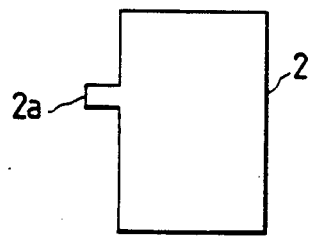

In FIGS. 1a and 1b, there is shown the valve metal foil 2 which has a rectangular form with a tab portion 2a. It is preferred to make the tab portion 2a although not essentially required. The valve metal foil used in the present invention is preferably made of aluminium or tantalum in a thickness of 20 to 600 μm although titanium or alloys of these metals may be used.

Figure 2A:
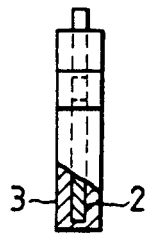
Figure 2B:
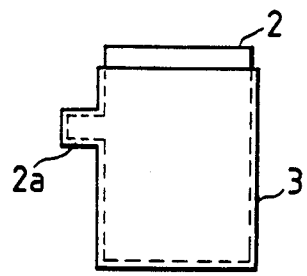

The etched valve metal foil 2 is anodized by immersion in an aqueous acid solution to form an dielectric oxide film 3 on the surface of the foil 1 including the tab portion 2a while keeping a part of the foil 2 as exposed as shown in FIGS. 2a and 2b. The anodization is effected by an ordinary electrochemical procedure. The acid used for this purpose may be inorganic acids, or salts thereof, such as phosphoric acid or an organic acid such as oxalic acid, adipic acid or the like. If the metallic foil is made of aluminium, $Al_2O_3$ is formed on the foil surface. Alternatively, if tantalum is used, $Ta_2O_5$ is formed as the dielectric oxide film 3.

The foil 2 on which the anodized film 3 has been formed is subsequently immersed in an aqueous solution of, for example, a water-soluble manganese compound for a given time and dried in air at 200° to 300° C., thereby thermally decomposing the nitrate into manganese dioxide to form a conductive inorganic layer 4 on the anodized film 3. The conductive inorganic layer 4 in this case is manganese dioxide. Examples of the water-soluble mangenese compound include manganese nitrate, and salts of manganese and acetyl acetone, oleic acid, naphthenic acid and the like. Of these, manganese nitrate is preferred because of its availability.

Figure 4A:
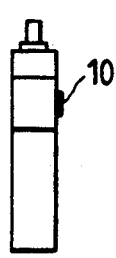
Figure 4B:
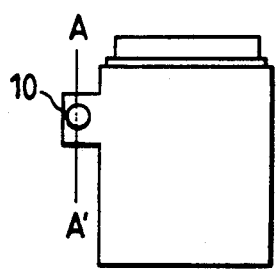

Thereafter, an electrode 10 for electrolytic polymerization is attached and electrically connected to the tab portion 2a as is particularly shown in FIGS. 4a and 4b. The electrode 10 is made of a material incapable of undergoing anodization in an electrolytic polymerization solution. Examples such materials include metals such as nickel, silver, platinum, stainless steels, gold, copper and the like, carbon, conductive polymers obtained by chemical polymerization of pyrrole and thiophene and the like. If metals are used, they may be used in the form of a foil. With the foil, the foil is welded to the tab portion 2 or may be attached by caulking, by which the foil is directly contacted with the valve metal foil 2 at the tab portion 2a.

In FIG. 4, the electrode 10 is attached to the tab portion 2a on one side of the tab portion 2a. A plurality of electrodes may be provided on one or opposite sides of the tab portion 2a. As stated before, it is not essentially required to form the tab portion 2a but the electrode 10 may be directly formed on the tab-free valve metal foil 2. In the latter case, the dielectric film 3 may be, more or less, damaged when the electrode 10 is removed. Accordingly, it is preferred to form the tab portion 2a to which the electrode 10 is attached.

Since the electrode is made of a material incapable of undergoing anodization during electrolytic polymerization, a polymerization potential is continuedy applied during the polymerization, thereby causing a conductive polymer film to be formed from the electrode quickly.

Figure 5:
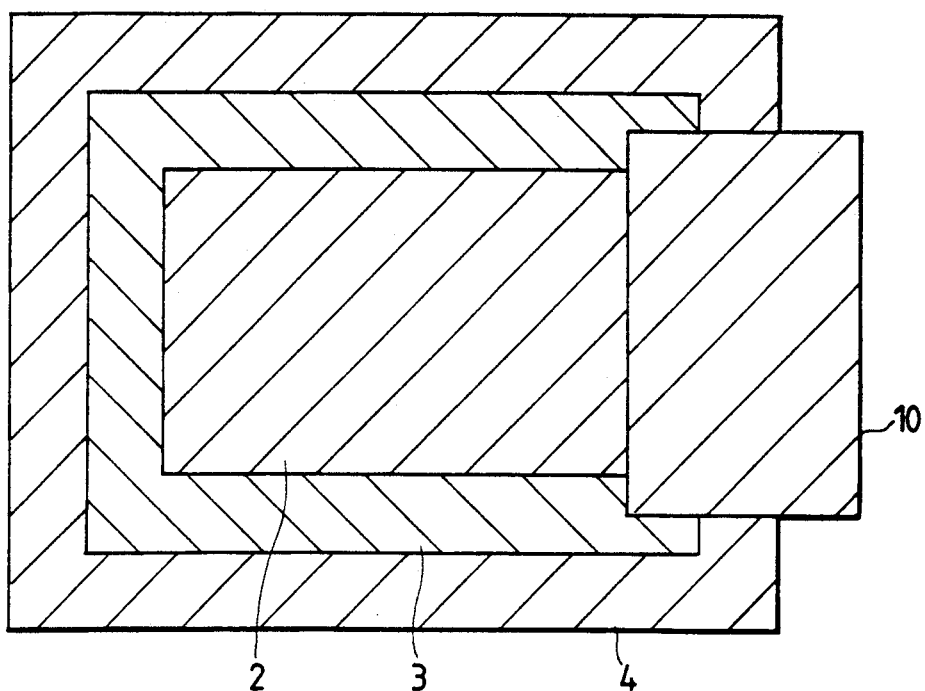

The electric connection between the valve metal foil 2 and the electrode 10 is particularly shown in FIG. 5.

In this condition, the valve metal foil 2 having the electrode 10 is placed in an electrolytic polymerization solution in a vessel for electrolytic polymerization. A counter electrode (not shown) for the electrolytic polymerization is placed in the vessel while keeping the electrode 10 apart from the counter electrode.

Figure 6A:
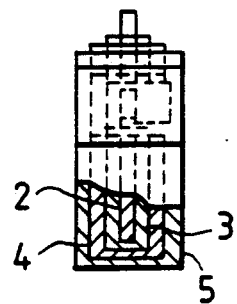
Figure 6B:
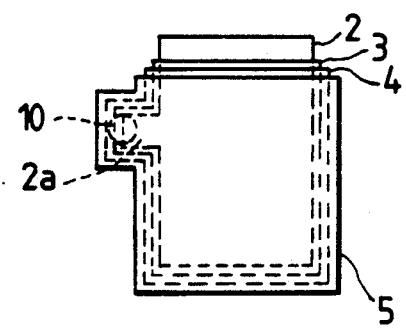

The electrode 10 and the counter electrode are applied with a polymerization potential higher than a potential for polymerization. By this, a conductive polymer film 5 is formed on the conductive inorganic layer 4 while covering the tab portion 2a as shown in FIGS. 6a and 6b. Although the formation rate of the conductive polymer film 5 depends on the potential, the electrolytic polymerization is ordinarily continued for 10 minutes to 1.5 hours. The conductive polymer film having a thickness of from 5 to 30 micrometers is formed.

If necessary, a graphite or carbon paste film 6 and a silver paste film 7 are applied and thermally cured to form a conductive layer P having a double-layer structure which includes the films 6 and 7 as shown in FIGS. 7 and 8.

Thereafter, the electrode 10 is removed by breakage along with part of the tab portion 2a, the dielectric film 3, the inorganic conductive film 4 and the conductive polymer film 5, and/or the cured carbon paste film 6 and the cured silver paste film 7 in association with the electrode 10. This is particularly shown in FIGS. 9a and 9b.

If the electrode 10 for the electrolytic polymerization is left as it is, short-circuiting takes place between the valve metal foil 2 and the conductive polymer film 5, thereby impeding the performance of the capacitor. In the practice of the invention, the electrode 10 is removed along with the conductive polymer film 5 and, if present, the cured paste films 6, 7, so that the capacitor performance is not impeded. In this sense, the valve metal foil 2 should preferably have the tab portion 2a projecting from the valve metal foil 2, to which the electrode 2 is attached. For the removal of the electrode, only the tab portion 2a is removed from the valve metal foil 2, so that the dielectric film 3 on the body of the valve metal foil 2 is not damaged.

Finally, a lead 1 for the positive electrode and a lead 8 for the negative electrode for the capacitor used as terminals are, respectively, attached to the valve metal foil 2 and the cured silver paste film 7 as shown in FIG. 10. If the films 6 and 7 are not formed, the negative electrode lead 8 is attached to the conductive polymer film 5.

The capacitor unit C may be covered with polymer resins such as epoxy resins, glass or the like, by a usual manner.

The electrolytic polymerization is described to form the conductive polymer film 5.

The electrolytic polymerization solution 13 placed in the vessel consists of an electrolytically polymerizable monomer and a support electrolyte in a solvent. The monomer and the electrolyte are usually dissolved in water or an organic solvent in amounts of 0.1 to 1 moles/liter and from 0.01 to 0.5 moles/liter, respectively.

The solvent may be any inert compounds capable of dissolving both the monomer and electrolyte. Examples of such solvents include water and non-aqueous polar solvents such as acetonitrile, propylene carbonate, γ-butyrolactone, dimethylformamide and the like.

Examples of the monomers include pyrrole or its derivatives having a substituent, a dimer or trimer of pyrrole, thiophene or its derivatives having a substituent, a dimer of thiophene or bithiophene, or a trimer of thiophene or terthienyl, and mixtures thereof. Examples of the substituent for both pyrrole and thiophene derivatives include a lower alkyl group such as methyl, a lower alkoxy group such as methoxy, ethoxy or the like, an aryl group such as phenyl, and the like. Preferably, at least one of pyrrole, thiophene and derivatives thereof is used.

The support electrolytes may be any known support electrolytes and include, for example, ordinary organic or inorganic perchlorates, sulfonates, carboxylates and phosphates, among which sulfonates of naphthalene having an alkyl substituent substituents and alkyl phosphates. Specific examples include sodium monomethylnaphthalenesulfonate, sodium triisopropylnapthalenesulfonate, sodium monoisopropylnaphthalenesulfonate, sodium butylnaphthalenesulfonate, propyl phosphate, butyl phosphate, hexyl phosphate and the like.

As a matter of course, the monomers and the support electrolytes may, respectively, be used in combination. Additives ordinarily used in the art may be added to the electrolytic polymerization solution. Especially, in order to improve adhesion between the conductive polymer layer and the conductive inorganic layer 4 and/or the graphite layer 6, polymers such as polyhydroxystyrene, novolac resins, polyacrylic acid, polymethacrylic acid and copolymers of monomers of these polymers mentioned above may be added to the solution 13. In this case, the polymer should preferably be added at a concentration of 0.1 to 2 wt % based on the solution.

After the formation of the conductive polymer film 5, the film 5 is washed with water and dried, after which the carbon or graphite paste film 6 and the silver paste film 7 are formed.

In the above embodiment, the electrode 10 for electrolytic polymerization is formed on the tab portion 2a but may be directly formed on the valve metal foil 2 having no tab portion 2a. In this case, the portion on which the electrode 10 is formed is removed in the same manner as stated before, so that the valve metal foil 2 will be partially cut away. This will not adversely influence the capacitor characteristics provided that any short-circuiting does not occur owing to the partial cutting. Preferably, the valve metal foil 2 is so shaped as having the tab portion 2a.

Reference is now made to FIGS. 11 to 18 wherein another embodiment is illustrated. In this and subsequent embodiments, a similar procedure and similar steps as in the first embodiment are not described but only different steps are described. Unless otherwise specified, the materials, reaction and formation conditions and the like used in the first embodiment will be likewise used in these embodiments.

Figure 3A:
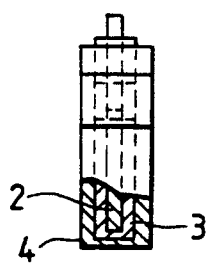
Figure 3B:
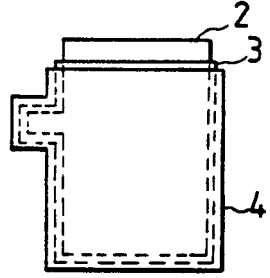
Figure 11:
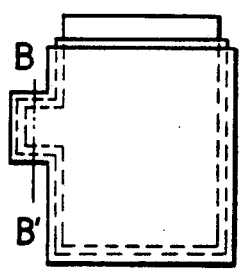
Figure 12A:
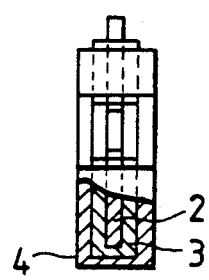
Figure 12B:
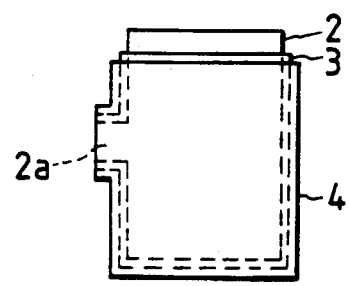

After formation of the inorganic conductive film 4 as shown in FIGS. 3a and 3b, the tab portion 2a is cut off or broken down along the line B—B' of FIG. 11 to permit the valve metal foil 2 to be exposed as shown in FIGS. 12a and 12b.

Figure 13A:
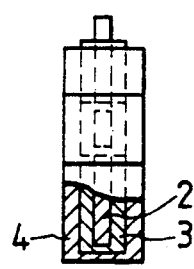
Figure 13B:
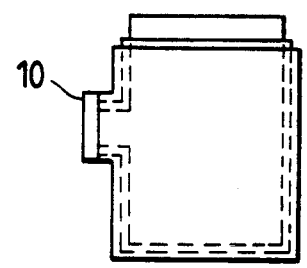

In this embodiment, a conductive paste or pastes such as a silver and/or a carbon paste is applied onto the exposed portion and thermally cured to form the electrode for electrolytic polymerization as shown in FIGS. 13a and 13b.

In addition, conductive polymers may be applied by chemical polymerization of monomers on the tab portion 2a by a procedure wherein an oxidizing agent such as ammonium persulfate is applied on the exposed portion and dried, after which the dried portion is immersed in a monomer solution such as pyrrole or thiophene and chemically polymerized. The pastes or conductive polymer should be applied to the tab portion 2a after exposure of the valve metal foil 2 by breakage along with the dielectric film 3 and the manganese dioxide film 4.

The conductive polymer film 5, the cured conductive carbon paste film 6 and the cured conductive silver paste film 7 are formed as shown in FIGS. 14 to 16 in the same manner in the first embodiment.

Figure 17A:
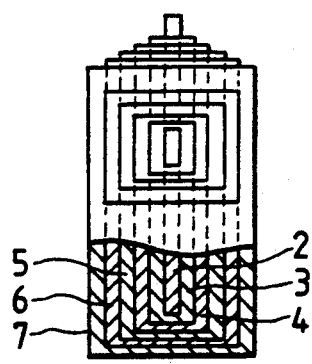
Figure 17B:
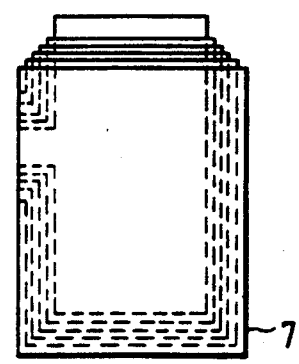

Thereafter, the electrode 10 is removed by breakage along with the foil 2 and the other films 3, 4, 5, 6 and 7 as shown in FIGS. 17a and 17b.

Figure 18:
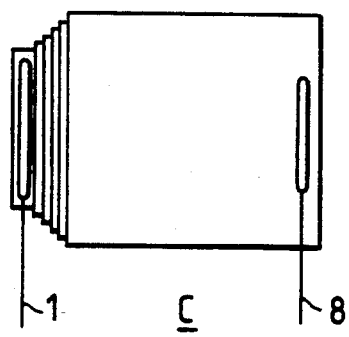

The positive electrode lead 1 and the negative electrode lead 8 are, respectively, attached to the valve metal foil 2 and the silver paste film 7 as shown in FIG. 18 to obtain the capacitor unit C.

A further embodiment is described with reference to FIGS. 19 to 22 which is effective in further improving leakage current.

In this embodiment, the conductive polymer film 5 is formed in the same manner as in the first embodiment.

Figure 7A:
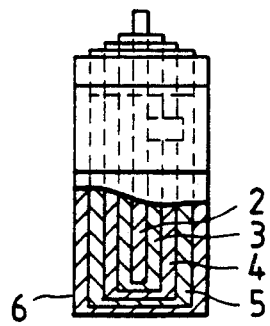
Figure 7B:
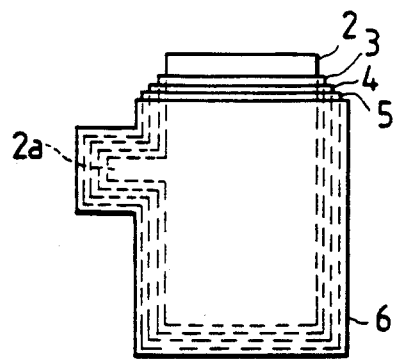

Thereafter, the electrode 10 for the electrolytic polymerization is removed along with the valve metal foil 2, the dielectric film 3, the inorganic conductive film 4 and the conductive polymer film 5 to expose the valve metal foil at the removed portion as shown in FIGS. 7a and 7b.

Figure 20A:
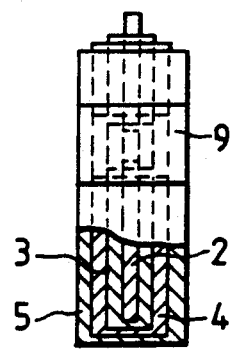
Figure 20B:
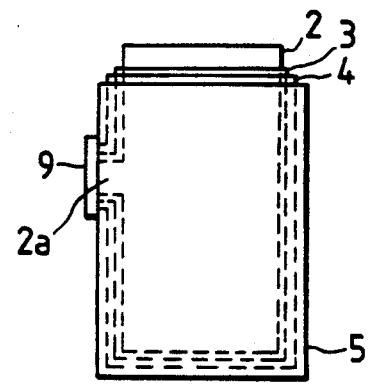

Thereafter, an insulating film 9 is formed over the exposed portion of the valve metal foil 2 at the tab portion 2a as shown in FIGS. 20a and 20b. The insulating film may be made of a UV curable resin in view of ease in application. The applied UV curable resin is irradiated with UV rays for curing. Alternatively, thermosetting resins such as epoxy resins, polyimides, polyimide-amides and silicone rubbers may be likewise used along with curing agents. In this case, a solution of the resin is applied to the exposed portion and thermally cured.

Subsequently, the cured carbon paste film 6 and the cured silver paste film 7 may be formed in the same manner as in the foregoing embodiments. This is particularly shown in FIGS. 21 and 22 wherein the insulating film 9 is left on the exposed portion as it is. In addition, the leads 1 and 8 are, respectively, attached to the valve metal foil 2 and, if present, the silver paste film 7 serving as a negative electrode as shown in FIGS. 10 and 18.

FIGS. 23 to 26 show another embodiment of the invention wherein cured films of carbon and silver pastes are essentially used over the conductive polymer film.

Figure 23A:
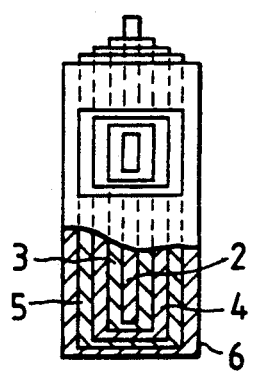
Figure 23B:
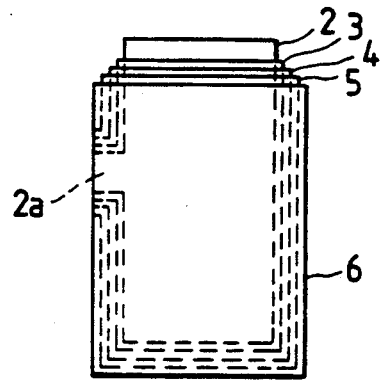

After formation of the cured carbon paste film 6 in the same manner as in the foregoing embodiments, the electrode 10 for the electrolytic polymerization is removed by breakage as shown in FIG. 23a and 23b.

Figure 24A:
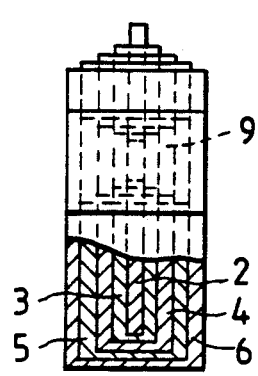
Figure 24B:
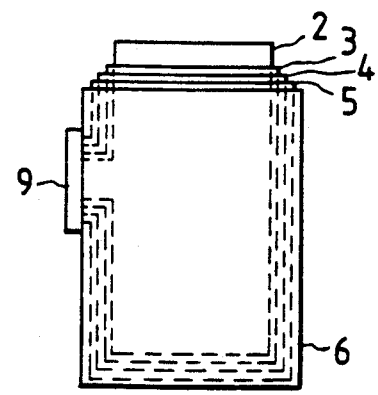
Figure 25A:
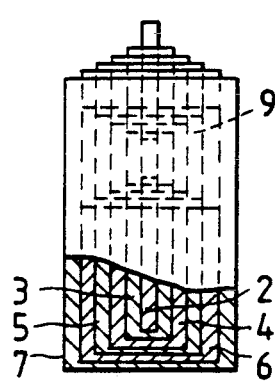
Figure 25B:
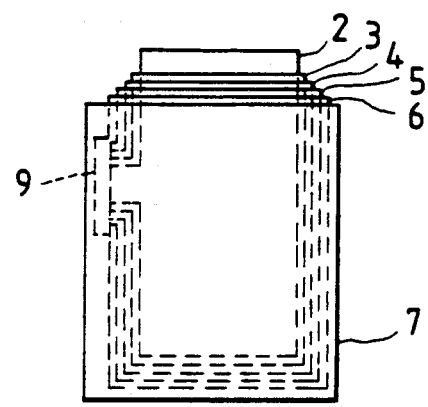
Figure 26:
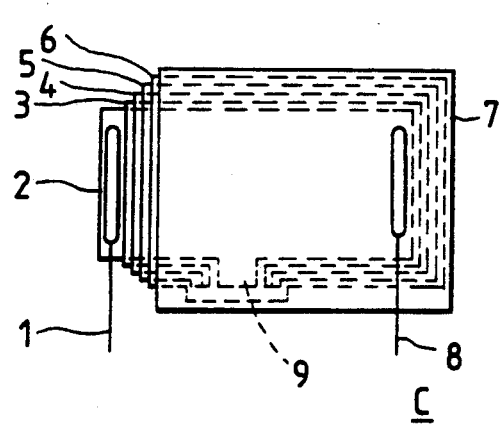

Thereafter, the insulating film 9 as in the embodiment referring to FIGS. 19 to 22 is formed as shown in FIGS. 24a and 24b, followed by formation of the silver paste film 7 and attachment of the lead electrodes 1 and 8 as shown in FIGS. 25 and 26 in the the same manner as in the foregoing embodiments to complete the capacitor unit C.

FIGS. 27 to 30 shows still another embodiment of the invention wherein insulating film 9 is attached to the exposed portion of the tab portion 2a after formation of the silver paste film 7.

Figure 27A:
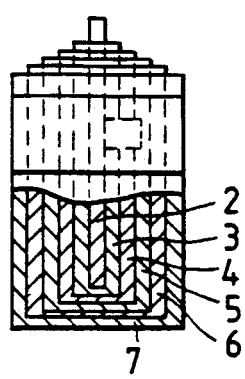
Figure 27B:
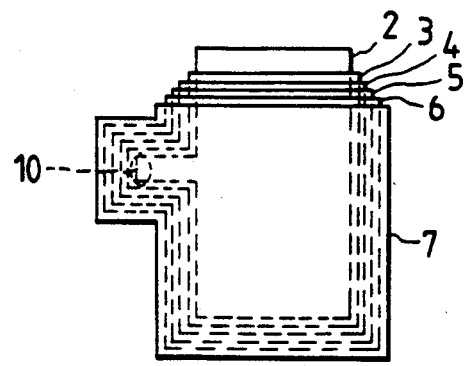
Figure 28A:
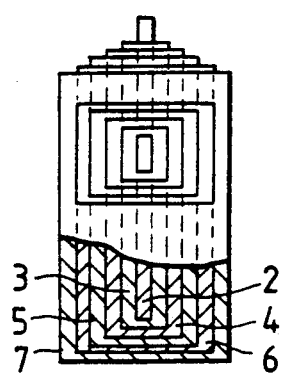
Figure 28B:
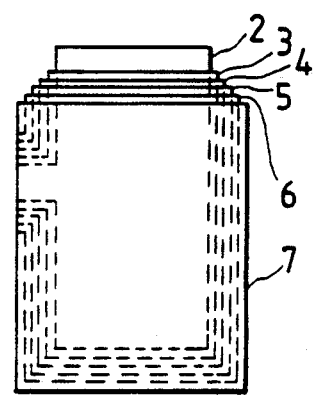
Figure 29A:
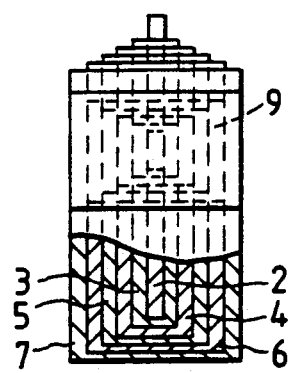
Figure 29B:
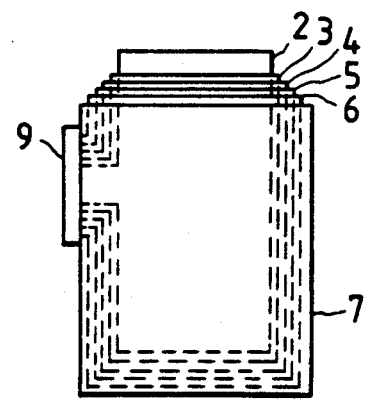
Figure 30:
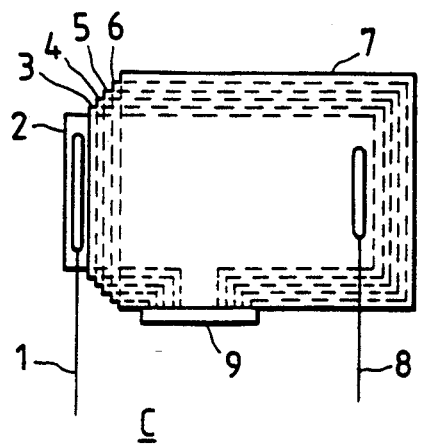

More particularly, in the same manner as in FIGS. 1 to 8 relating to the first embodiment, the cured carbon paste film 6 and the cured silver paste film 7 are formed on the conductive polymer film 5 as shown in FIGS. 27a and 27b, after which the electrode 10 for the electrolytic polymerization is removed as shown in FIGS. 28a and 28b. Thereafter, the resultant exposed portion of the valve metal is covered with the insulating film 9 as shown in FIGS. 29a and 29b, followed by attachment of the positive lead electrode 1 and the negative lead electrode 8 as shown in FIG. 30.

In the embodiments set forth above, the capacitor unit C may be covered with a resin as in the first embodiment.

Yet another embodiment of the invention is described with reference to FIGS. 31 to 33.

Figure 31A:
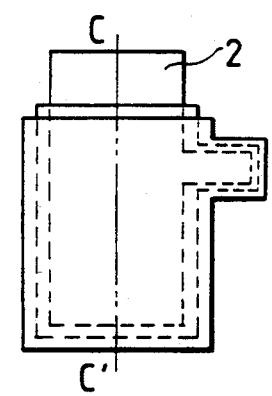
Figure 31B:
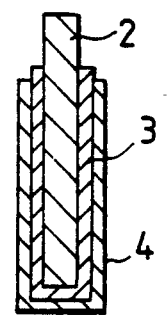
FIG. 31b is a side view in section.
Figure 32A:
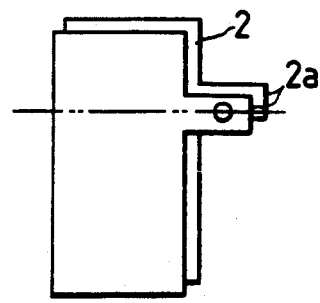
Figure 32B:
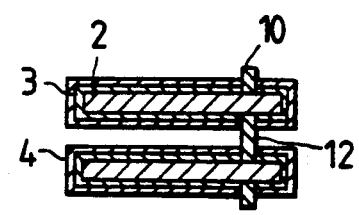
FIG. 32b is a sectional view taken along the line C—C'.

In this embodiment, at least two valve metal foils are used, and each foil has the dielectric film 3 and the inorganic conductive film 4 as shown in FIGS. 31a and 31b. In FIGS. 32a and 32b, there are shown two valve metal foils 2, 2 which are electrically connected to each other through a conductive piece 12. The conductive piece 12 is provided not only to establish the electric connection, but also to fix the two valve metal foils 2, 2 in a spaced relation to each other. In addition, electrodes 10a, 10b may be attached to the outer surfaces of the tab portions 2a of the respective foils 2, 2 as shown in the figures, if necessary.

The conductive piece 12 is attached to the valve metal foils for electric connection of the two foils by welding of a material which does not undergo anodization or may be formed by application of a silver or carbon paste or a chemically polymerized conductive polymer after exposure of the valve metal foil, like the electrode 10 in the foregoing embodiments. In short, the conductive piece 12 and the electrodes 10a, 10b may be formed in the forgoing embodiments with respect to FIGS. 4 and 13.

Figure 33:
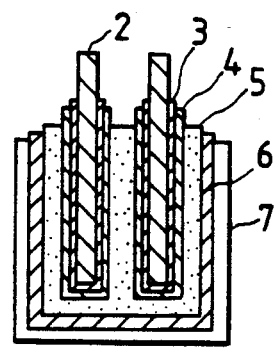

Subsequently, the electrolytic polymerization is performed in the same manner as in the foregoing embodiments to form a conductive polymer film 5 on the surfaces of the two foils and between the two foils as shown in FIG. 33.

Figure 8A:
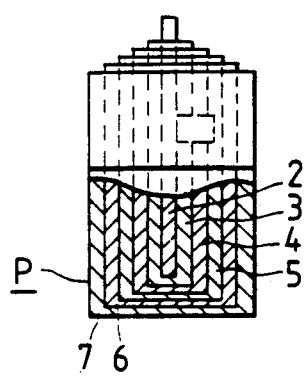

In this embodiment, the conductive piece 12 and the electrodes 10a, 10b may be removed after the formation of the conductive polymer film 5 or after formation of the conductive cured paste layer P on the conductive polymer film 5 as shown in FIG. 8a. In the former case, the conductive cured paste layer P is subsequently formed on the conductive polymer film 5.

As a matter of course, the exposed portions of the valve metal foils 2, 2 which are formed by the removal of the conductive piece 12 and the electrodes 10a, 10b may be covered with the insulating film 9 as shown in FIG. 29.

The number of valve metal foils is not critical and ten or more foils may be integrally combined in one capacitor unit. Accordingly, a very compact capacitor with a high capacitance can be readily obtained.

In this embodiment, the fabrication procedures used in the foregoing embodiments are likewise used except that the at least two valve metal foils are used. Accordingly, the capacitor unit having at least two valve metal foils may be covered with a resin casing.

The present invention is more particularly described by way of examples. Comparative examples are also shown.

EXAMPLE 1

A capacitor of the type shown in FIGS. 1 to 10 is described in this example.

An aluminium etched foil 2 having a tab portion 2a as shown in FIGS. 1a and 1b was anodized in a 7% ammonium adipate aqueous solution at about 70° C. for 40 minutes by application of a potential of 42 volts to form a dielectric film 3 as shown in FIGS. 2a and 2b. Thereafter, a manganese nitrate aqueous solution was applied onto the dielectric film 3 and thermally decomposed at 300° C. for 20 minutes to form a conductive manganese dioxide film 4 as shown in FIGS. 3a and 3b. An electrode 10 for initiating electrolytic polymerization which was made of a nickel foil piece with a diameter of 1 mm and a thickness of 50 μm was formed on the manganese dioxide film 4 by welding. As shown in FIG. 5 which is a section taken along the line A—A' of FIG. 4b, the nickel foil contacted the valve metal 2 through the dielectric film 3 and the manganese dioxide film 4.

The valve metal foil 2 was then immersed in an electrolytic polymerization solution comprised of 0.25 moles of pyrrole, 0.1 mole of triisopropyl naphthalenesulfonate, and water. A constant voltage of 2.5 volts was applied for 30 minutes between the nickel foil electrode and a counter electrode placed in the solution in a spaced relation with the nickel foil electrode, thereby forming a conductive polypyrrole film 5 on the manganese dioxide film 4 as shown in FIGS. 6a and 6b.

Thereafter, as shown in FIGS. 7a, 7b, 8a and 8b, a carbon paste film 6 and a silver paste film 7 were formed on the conductive polypyrrole film 5 and cured. Subsequently, the nickel foil 10 was removed by breakage along with the valve metal foil 2, the dielectric film 3, the manganese dioxide film 4, the conductive polypyrrole film 5, the carbon paste film 6 and the silver paste film 7 as shown in FIGS. 9a and 9b. Finally, a positive electrode lead 1 was welded to the valve metal foil 2 and a negative electrode lead 8 was attached to the silver paste film 7 as shown in FIG. 10. The resultant capacitor unit was covered with a resin to obtain a solid electrolytic capacitor.

EXAMPLE 2

A capacitor of the type shown in FIGS. 11 to 18 is described.

In the same manner as in Example 1, the dielectric film 3 and the manganese dioxide film 4 were, respectively, formed on the aluminium etched foil 2.

The tab portion 2a of the foil 2 was cut off along the line B—B' of FIG. 11 to expose the foil 2 at the cut portion which had been covered with the dielectric film 3 and the manganese dioxide film 4 as shown in FIGS. 12a and 12b.

A silver paste was applied to the exposed portion and thermally cured at 120° C. for 10 minutes to form an electrode 10 for initiating electrolytic polymerization as shown in FIGS. 13a and 13b.

Figure 14A:
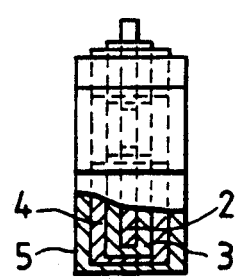
Figure 14B:
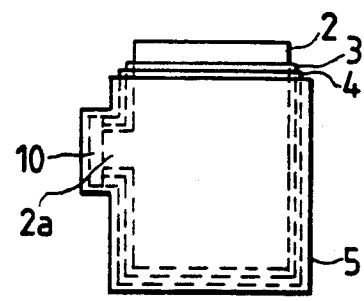
Figure 15A:
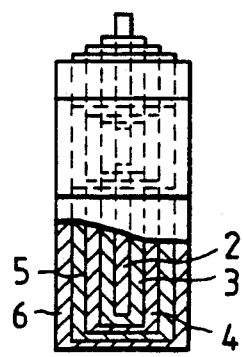
Figure 15B:
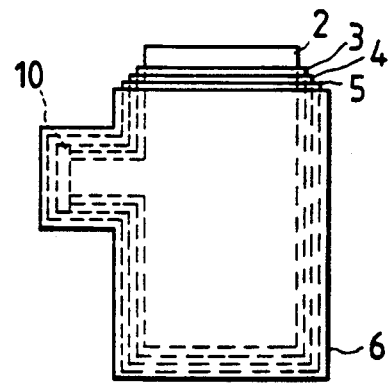
Figure 16A:
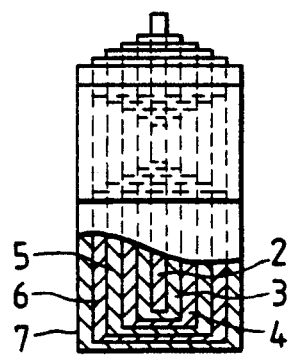
Figure 16B:
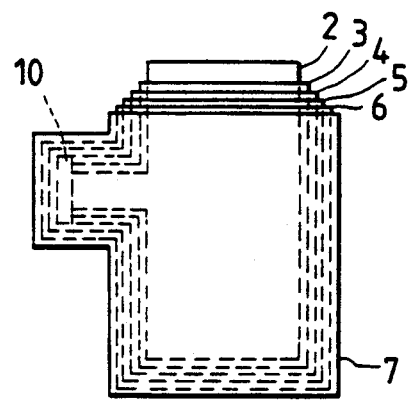

The valve metal foil 2 was then immersed in an electrolytic polymerization solution comprised of 0.25 moles of pyrrole, 0.1 mole of triisopropyl naphthalenesulfonate, and water. A constant voltage of 2.5 volts was applied for 40 minutes between the cured silver paste electrode and a counter electrode placed in the solution in a spaced relation with the electrode, thereby forming a conductive polypyrrole film 5 on the manganese dioxide film 4 as shown in FIGS. 14a and 14b.

Thereafter, a carbon paste film 6 and a silver paste film 7 were successively formed on the film 5 as shown in FIGS. 15a, 15b, 16a and 16b.

As shown in FIGS. 17a and 17b, the cured silver paste electrode 10 was removed along with the valve metal foil 2, the dielectric film 3, the manganese dioxide film 4, the conductive polypyrrole film 5, the carbon paste film 6 and the silver paste film 7. A lead 1 for positive electrode was welded to the foil 2 and a lead 9 for negative electrode 7 was attached to the silver paste film 7 as shown in FIG. 18, followed by coverage with a resin to obtain a solid electrolytic capacitor.

COMPARATIVE EXAMPLE 1

The general procedure of Example 2 was repeated except that the silver paste was not applied to the exposed portion of the foil 2 but the exposed portion was used as the electrode for the electrolytic polymerization, so that the aluminium foil underwent chemical reaction in the electrolytic solution and the resistance was increased to prevent the electrolytic polymerization reaction, i.e. it took 160 minutes to complete the electrolytic polymerization, thereby obtaining a solid electrolytic capacitor.

COMPARATIVE EXAMPLE 2

Figure 8B:
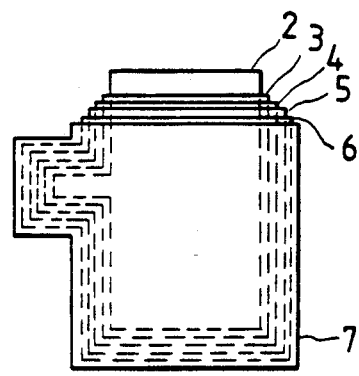
Figure 9A:
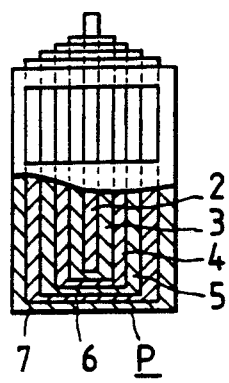
Figure 9B:
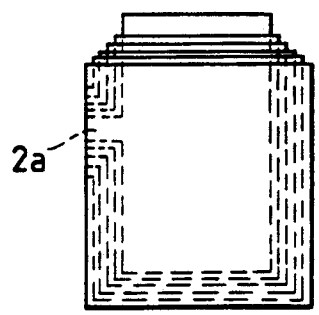

The general procedure of Example 1 was repeated except that the nickel foil 10 was not removed along with the aluminium foil 2, the dielectric film 3, the manganese dioxide film 4, the conductive polypyrrole film 5, the carbon paste film 6 and the silver paste film 7 and that the lead 8 was attached to the silver paste film 7 of the unit as shown in FIGS. 8a and 8b, thereby obtaining a solid electrolytic capacitor.

EXAMPLE 3

The general procedure of Example 2 was repeated except that a carbon paste was used instead of the silver paste and was thermally cured at 120° C. for 5 minutes and that the electrolytic polymerization was effected for 60 minutes, thereby obtaining a solid electrolytic capacitor.

EXAMPLE 4

The general procedure of Example 2 was repeated except that there was used, instead of the silver paste electrode, a conductive polymer electrode which was obtained by applying an aqueous solution of 0.01 mole/liter of ammonium persulfate onto the exposed portion, drying the solution, and immersing the dried portion in a pyrrole monomer solution for 5 minutes to cause chemical polymerization of the monomer, thereby obtaining a solid electrolytic capacitor.

EXAMPLE 5

In this example, any tab portion is provided but a valve metal foil is cut an arbitrary portion thereof at which an electrode for electrolytic polymerization is formed.

A tantalum foil was anodized in a 1% phosphoric acid aqueous solution at about 90° C. for 60 minutes at a potential of 30 volts to form a dielectric film on the surface thereof with a capacitance-in-liquid of 1.1 $\mu$ F/cm$^2$. A manganese nitrate aqueous solution was applied onto the dielectric oxide film and thermally decomposed at 300° C. for 20 minutes to form a manganese dioxide conductive film.

The valve metal covered with both films was cut off at the bottom thereof in a length of 1 mm, thereby exposing part of the valve metal foil. A silver paste was applied to the exposed portion and thermally cured at 120° C. for 10 minutes to form an electrode for electrolytic polymerization.

The valve metal foil was immersed in an electrolytic polymerization solution consisting of 0.25 moles of pyrrole, 0.1 mole of n-butyl phosphate and water. A constant potential of 2.5 volts was applied between the Ag paste electrode and a counter electrode placed in the solution in a spaced relation with the paste electrode for 20 minutes, thereby forming a conductive polymer film on the manganese dioxide film.

A cured carbon paste film and a cured silver paste film were formed on the conductive polymer film in this order. Thereafter, the Ag paste electrode was removed along with the conductive polymer film, carbon paste film and Ag paste film.

A lead was attached to the Ag paste film and a lead was attached to the valve metal foil as in the foregoing examples, followed by coverage with a resin to obtain a solid electrolytic capacitor.

The capacitors obtained in the examples and comparative examples were subjected to initial characteristics including a capacitance measured at 120 Hz and a loss measured at 120 Hz, a leakage current determined 2 minutes after application of a rated voltage and an impedance measured at 1 MHz. The results are shown in Table 1 along with the time for the formation of polymer film.

TABLE 1

| | Capacitance ($\mu F$) | Loss (%) | Leakage Current ($\mu A$) | Impedance | Formation Time of Polymer Film (minutes) |
|---|---|---|---|---|---|
| Example | | | | | |
| 1 | 4.02 | 1.3 | 0.032 | 13 m$\Omega$ | 30 |
| 2 | 4.12 | 1.2 | 0.043 | 14 m$\Omega$ | 40 |
| 3 | 4.22 | 1.3 | 0.064 | 16 m$\Omega$ | 60 |
| 4 | 4.30 | 1.1 | 0.029 | 11 m$\Omega$ | 40 |
| 5 | 1.16 | 1.0 | 0.069 | 19 m$\Omega$ | 20 |
| Comp. Ex. | | | | | |
| 1 | 3.88 | 3.1 | 0.051 | 14 m$\Omega$ | 160 |
| 2 | 114.3 | 10.6 | >1000 | 12.6 $\Omega$ | 30 |

The capacitors obtained in the examples of the invention exhibit satisfactorily good capacitance, impedance and leakage current and the conductive polymer film can be formed at high speeds. The capacitor of Comparative Example 1 has a great loss, and a time for the polymer formation is too long. With the capacitor of Comparative Example 2, the leakage current is too large to function as a capacitor.

EXAMPLE 6

A capacitor of the type shown in FIGS. 19 to 22 is described in this example.

In the same manner as in Example 1, an aluminum etched film was formed thereon with a dielectric film, a manganese dioxide film and a conductive polypyrrole film as shown in FIGS. 1 to 6.

Figure 19A:
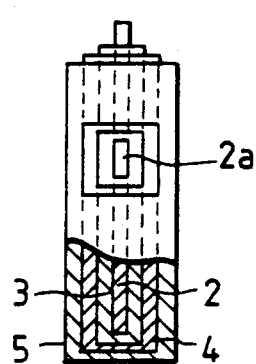
Figure 19B:
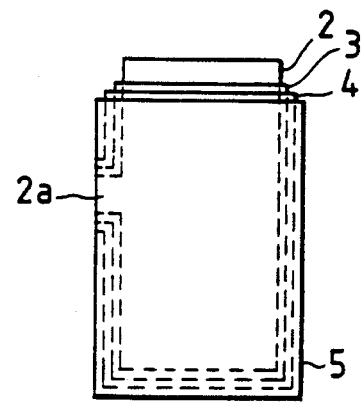

Thereafter, the electrode 10 was removed along with the valve metal foil 2, the dielectric film 3, the manganese dioxide 4 and the conductive polymer film 5 as shown in FIGS. 19a and 19b.

As shown in FIGS. 20a and 20b, a UV curable resin was applied onto the exposed portion of the foil 2 and irradiated with a UV ray (363 nm, 180 W) for 1 minute to form an insulating film 9.

Figure 21A:
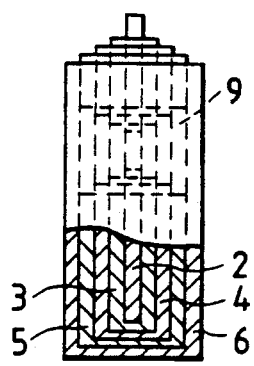
Figure 21B:
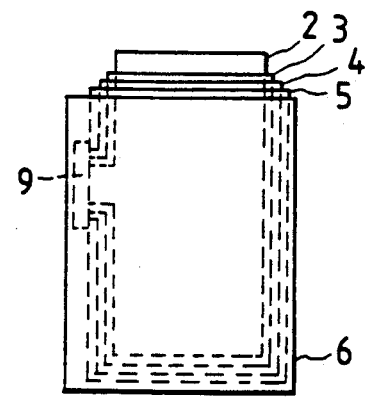
Figure 22A:
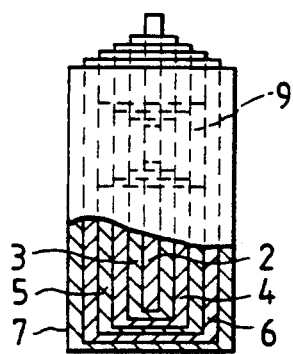
Figure 22B:
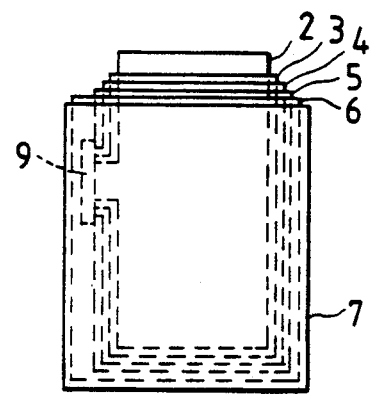

Thereafter, a cured carbon paste film 6 and a cured silver paste 7 were formed on the conductive polypyrrole film 5 and the insulating film 9 as shown in FIGS. 21 and 22. Thereafter, leads 1 and 8 were attached in the same manner as in the foregoing examples, followed by coverage with a resin to obtain a solid electrolytic capacitor.

EXAMPLE 7

A capacitor of the type shown in FIGS. 23 to 26 is described in this example.

In the same manner as in Example 1, an aluminium etched film was formed thereon with a dielectric film, a manganese dioxide film and a conductive polypyrrole film as shown in FIGS. 1 to 6.

After formation of the conductive polypyrrole film 5, a cured carbon paste film 6 was formed as shown in FIGS. 23a and 23b and the electrode 10 was removed, as shown in FIGS. 23a and 23b, along with the valve metal foil 2, the dielectric film 3, the manganese dioxide film 4, the conductive polypyrrole film 5 and the carbon paste film 6 by breakage. Thereafter, a UV curable resin was applied and irradiated in the same manner as in Example 6 to form an insulating film 9, followed by the same procedure of Example 6 to obtain a solid electrolytic capacitor. This procedure is particularly shown in FIGS. 24 to 26.

It will be noted that if the exposed portion is not covered with the insulating film 9 and conductive pastes are applied such as by dipping, the exposed portion of the valve metal foil is contacted with the silver paste film 7 and thus, short-circuiting takes place. This will lead to a lowering of production efficiency.

EXAMPLE 8

The general procedure of Example 7 was repeated except that the electrode 10 was removed after formation of the carbon paste film 6 and the silver paste film 7, and the insulating film was subsequently formed as is particularly shown in FIGS. 27 to 29, followed by attachment of the leads 1 and 8 and coverage with a resin as in the foregoing examples, thereby obtaining a solid electrolytic capacitor.

EXAMPLE 9

The general procedure of Example 6 was repeated except that a polyimide was used as the insulating film 9, i.e. a polyimide varnish (Toraynese #200, available from Toray Co., Ltd.) was applied to the exposed portion and dried at 100° C. for 1 hour or at 150° C. for 1 hour, thereby obtaining solid electrolytic capacitors.

EXAMPLE 10

The general procedure of Example 6 was repeated except that polyamide-imide was used as the insulating film 9, i.e. a polyamide-imide varnish (HI-400, available from Hitachi Chem. Co., Ltd.) was applied to the exposed portion and dried at 100° C. for 2 hours or at 150° C. for 2 hours, thereby obtaining solid electrolytic capacitors.

EXAMPLE 11

The general procedure of Example 6 was repeated except that silicone rubber was used as the insulating film 9, i.e. a room temperature vulcanizable silicone rubber (KE 3475, available from Shin-Etsu Chem. Ind. Co., Ltd.) was applied to the exposed portion and dried at 60° C. and 90% R.H. for 1 hour, thereby obtaining a solid electrolytic capacitor.

EXAMPLE 12

The general procedure of Example 8 was repeated except that after removal of the electrode 10, the exposed portion was not covered with the insulating material, thereby obtaining a solid electrolytic capacitor.

The capacitors obtained in Examples 6 to 12 were subjected to measurements of initial characteristics as in the foregoing examples and also to a heat cycle test to determine a yield with respect to the leakage current.

The results of the measurements of the initial characteristics are shown in Table 2 below.

TABLE 2

|  | Capacitance (μF) | Loss (%) | Leakage Current (μA) | Impedance (mΩ) |
| --- | --- | --- | --- | --- |
| Example |  |  |  |  |
| 6 | 5.02 | 1.1 | 0.032 | 12 |
| 7 | 5.10 | 1.1 | 0.035 | 12 |
| 8 | 5.32 | 1.1 | 0.027 | 11 |
| 9 | 5.22 | 1.2 | 0.053 | 12 |
| 10 | 5.11 | 1.2 | 0.034 | 14 |
| 11 | 4.86 | 1.4 | 0.022 | 19 |
| 12 | 5.22 | 1.1 | 0.043 | 12 |

As will be apparent from the above results, good capacitance, impedance and leakage current characteristics are obtained for the capacitors of Examples 6, 7, 9, 10 and 11 although short-circuiting takes place if the insulating film is not formed for these capacitors. This is because the pastes are applied to the exposed portion.

The comparison between the capacitors of Example 8 and 12 wherein any insulating film was not formed reveal that the leakage current characteristic is improved for the capacitor of Example 8.

The results of the heat cycle test are shown in Table 3. The heat cycle conditions include a cycle of −40° C./30 minutes and +105° C./30 minutes. When the leakage current was not less than 0.5 μA two minutes after application of a predetermined potential, such a capacitor was determined as unaccepted. In the table, the results are indicated as (the number of accepted samples)/(the number of test samples).

TABLE 3

|  | Number of Heat Cycles | | | |
| --- | --- | --- | --- | --- |
|  | 10 | 50 | 100 | 200 |
| Example |  |  |  |  |
| 6 | 50/50 | 50/50 | 50/50 | 50/50 |
| 7 | 50/50 | 50/50 | 50/50 | 49/50 |
| 8 | 50/50 | 50/50 | 50/50 | 50/50 |
| 9 | 50/50 | 50/50 | 50/50 | 49/50 |
| 10 | 50/50 | 50/50 | 49/50 | 49/50 |
| 11 | 50/50 | 50/50 | 48/50 | 47/50 |
| 12 | 50/50 | 46/50 | 40/50 | 36/50 |

The formation of the insulating film on the exposed portion of the valve metal foil is effective in improving the yield determined by the heat cycle test.

EXAMPLE 13

This examples illustrates an integrated type of capacitor wherein at least two capacitor elements are integrally set in one unit as shown in FIGS. 31 to 33.

An aluminium etched foil 2 having a tab portion 2a was anodized in 3% ammonium adipate aqueous solution at about 70° C. for 40 minutes to form a dielectric film 3 as shown in FIGS. 31a and 31b, followed by immersion in a 30% manganese nitrate aqueous solution, natural drying and thermal decomposition at 300° C. for 30 minutes to form a manganese dioxide film 4 on the dielectric film 3.

As shown in FIGS. 32a and 32b, two aluminium foils were provided and a nickel foil 10 was welded to the tab portion 2a of each foil 2. Moreover, a nickel foil 12 was also welded to the respective foils 2 to fix the foils 2 therewith in a spaced relation.

The fixed two foils 2, 2 were placed in an electrolytic polymerization solution consisting of 0.5 moles of pyrrole, 0.1 mole of sodium triisopropylnaphthalenesulfonate and water. A constant potential of 2.5 volts was applied for 30 minutes to the electrode 10 and a counter electrode placed in the solution in a spaced relation with the electrode 10 to form an electrolytically polymerized pyrrole film 5 on the manganese dioxide film 4 as shown in FIG. 33.

After the formation of the film 5, it was washed with water and dried, followed by formation of a cured carbon paste film 6 and a cured silver paste film 7 in this order. Thereafter, the nickel foils 10 and 12 were removed by breakage at the tab portion, followed by coverage with an epoxy resins. In this manner, ten capacitors were fabricated. The respective capacitors were aged at 20 volts for 1 hour and then subjected to measurements of a capacitance and a loss at 120 Hz, and a leakage current. In addition, an impedance at 500 kHz was measured. In Table 4, average values of ten measurements are shown. It will be noted that the capacitance was one which corresponds to that of two aluminium etched foils.

COMPARATIVE EXAMPLE 3

The general procedure of Example 13 was repeated except that the electrolytic polymerization was started from the tab portion from which part of the dielectric film was removed, without formation of the nickel foil piece, thereby obtaining ten capacitors. These capacitors were also subjected to measurements as in Example 13. The results are shown in Table 4.

EXAMPLE 14

The general procedure of Example 13 was repeated except that a separator paper was placed between the two aluminium foils on which the dielectric film and the manganese dioxide film had been formed, thereby obtaining ten solid electrolytic capacitors. The ten capacitors were subjected to measurements as in Example 13, with the results shown in Table 4.

In this example, the separator paper is used. Aside from plant fibers such as Manila hemp, synthetic fibers, glass fibers and the like may be used as a separator.

EXAMPLE 15

The general procedure of Example 13 was repeated except that after formation of the polypyrrole film, the nickel foils were removed and a UV curable resin was applied to the exposed portions of the aluminium foils and cured by irradiation of a UV ray to form an insulating film on the exposed portions, thereby obtaining ten capacitors. These capacitors were subjected to measurements as in Example 13, with the results shown in Table 4.

EXAMPLE 16

The general procedure of example 13 was repeated except that n-butyl phosphate was used instead of sodium triisopropylnaphthalenesulfonate, thereby obtaining ten solid electrolytic capacitors. These capacitors were subjected to measurements as in Example 13, with the results shown in Table 4.

EXAMPLE 17

The general procedure of Example 13 was repeated using an electrolytic polymerization solution consisting of 0.5 moles of thiophene, 0.1 mole of sodium tetrabutylammonium toluenesulfonate and acetonitrile instead of the electrolytic polymerization solution consisting of 0.5 moles of pyrrole, 0.1 mole of sodium triisopropylnaphthalenesulfonate and water, thereby obtaining ten capacitors. These capacitors were subjected to measurements as in Example 13, with the results shown in Table 4.

TABLE 4

| | Capacitance (μF) | Loss (%) | Leakage Current (μA) | Impedance (mΩ) |
|---|---|---|---|---|
| Example | | | | |
| 13 | 11.5 | 1.0 | 0.074 | 45 |
| 14 | 12.3 | 1.1 | 0.066 | 54 |
| 15 | 10.6 | 1.0 | 0.034 | 47 |
| 16 | 10.2 | 1.1 | 0.064 | 51 |
| 17 | 10.2 | 1.0 | 0.085 | 49 |
| Com. Ex. | | | | |
| 3 | 4.2 | 3.8 | 3.4 | 112 |

The comparison between the results of Example 13 and Comparative Example 3 reveal that the capacitor of Example 13 is significantly superior to that of Comparative Example 3.

The capacitors of Examples 14 to 17 are also good, among which the capacitor of Example 15 having an insulating film on the exposed portion after removal of the foils 10 and 12 is better in the leakage current.

What is claimed is:

1. A method for fabricating a solid electrolytic capacitor of the type which comprises a valve metal foil capable of forming a dielectric oxide film thereon, a dielectric oxide film formed on the valve metal foil except for a portion serving as an electrode for the capacitor, a conductive inorganic film formed on the dielectric oxide film, a conductive polymer film formed on the conductive inorganic layer by electrolytic polymerization, and leads formed on the valve metal foil and the conductive polymer film, respectively, the method comprising:
   (a) providing a valve metal foil having a dielectric film and a conductive inorganic film formed thereon in this order except for a portion of the valve metal foil serving as an electrode for the capacitor;
   (b) contacting an electrode for electrolytic polymerization with part of the valve metal foil wherein the electrode is made of a material incapable of undergoing anodization in an electrolytic polymerization solution;
   (c) subjecting the valve metal foil to electrolytic polymerization of a polymerizable compound in an electrolytic solution by application of a polymerization potential between the electrode for electrolytic polymerization and a counter electrode placed in the electrolytic solution in a spaced relation with the electrode for electrolytic polymerization until a conductive polymer layer serving as a solid electrolyte is formed on the conductive inorganic film; and
   (d) removing the electrode for the electrolytic polymerization from the valve metal foil and attaching leads to the electrode portion of the valve metal foil and the conductive polymer layer, respectively.

2. A method according to claim 1, wherein said valve metal is selected from the group consisting of aluminium and tantalum.

3. A method according to claim 1, wherein said electrode is made of a metal in the form of a foil piece incapable of undergoing the anodization and welded to said valve metal.

4. A method according to claim 1, wherein said electrode is made of a metal in the form of a foil piece incapable of undergoing the anodization and caulked to said valve metal.

5. A method according to claim 1, wherein said electrode is made of cured carbon or silver paste which is applied to the valve metal foil after exposure of the valve metal foil.

6. A method according to claim 1, wherein said electrode is made of a chemically polymerized conductive polymer which is applied to the valve metal foil after exposure of the valve metal foil.

7. A method according to claim 1, further comprising, after the step (c), applying and curing at least one conductive paste on the conductive polymer film, thereby forming a cured conductive paste film on the conductive polymer film wherein one of the leads is attached to the cured conductive paste film instead of the conductive polymer film.

8. A method according to claim 7, wherein said at least one conductive paste is a carbon and/or silver paste.

9. A method according to claim 7, wherein the cured conductive paste film is made of a cured carbon paste film and a cured silver paste film formed in this order.

10. A method according to claim 1, wherein said electrolytic polymerization solution comprises at least one member selected from pyrrole, thiophene and derivatives thereof and a support electrolyte.

11. A method according to claim 1, further comprising, after the step (d), forming an insulating film on an exposed portion of the valve metal foil by the removal of the electrode for electrolytic polymerization.

12. A method according to claim 11, further comprising applying and curing at least one conductive paste on the conductive polymer film and the insulating film wherein one of the leads is attached to the at least one conductive paste instead of the conductive polymer film.

13. A method according to claim 12, wherein said at least one conductive paste is a carbon and/or silver paste.

14. A method according to claim 12, wherein the cured conductive paste film is made of a cured carbon paste film and a cured silver paste film formed in this order.

15. A method according to claim 11, wherein said insulating film is made of at least one member selected from the group consisting of UV-cured resins, epoxy resins, polyimides, polyimide-amides and silicone rubbers.

16. A method for fabricating a solid electrolytic capacitor of the type which comprises a valve metal foil capable of forming a dielectric oxide film thereon, a dielectric oxide film formed on the valve metal foil, a conductive inorganic layer formed on the dielectric oxide film, a conductive polymer film formed on the conductive inorganic layer by electrolytic polymerization, a cured carbon paste film and a cured silver paste film formed on the conductive polymer film, and leads formed on the valve metal foil and the conductive polymer film, respectively, the method comprising the steps of:
   (a) providing a valve metal foil having a dielectric film and a conductive inorganic layer formed thereon in this order;
   (b) contacting an electrode for electrolytic polymerization with part of the valve metal foil wherein the electrode is made of a material incapable of undergoing anodization in an electrolytic polymerization solution;

(c) subjecting the valve metal foil to electrolytic polymerization of a polymerizable compound in an electrolytic solution by application of a polymerization potential between the electrode for electrolytic polymerization and a counter electrode placed in the electrolytic solution in a spaced relation with the electrode for electrolytic polymerization until a conductive polymer layer serving as a solid electrolyte is uniformly formed on the conductive inorganic layer;

(d) removing the electrode for the electrolytic polymerization from the valve metal foil;

(e) applying an insulating film over the removed portion;

(f) applying at least conductive paste on the conductive polymer film and the insulating film and curing the attached paste; and (g) attaching leads to the valve metal foil and the at least one cured conductive paste, respectively.

17. A method for fabricating a solid electrolytic capacitor of the type which comprises a valve metal foil capable of forming a dielectric oxide film thereon, a dielectric oxide film formed on the valve metal foil, a conductive inorganic layer formed on the dielectric oxide film, a conductive polymer film formed on the conductive inorganic layer by electrolytic polymerization, a cured carbon paste film and a cured silver paste film formed on the conductive polymer film, and leads formed on the valve metal foil and the conductive polymer film, respectively, the method comprising the steps of:

(a) providing a valve metal foil having a dielectric film and a conductive inorganic layer formed thereon in this order;

(b) contacting an electrode for electrolytic polymerization with part of the valve metal foil wherein the electrode is made of a material incapable of undergoing anodization in an electrolytic polymerization solution;

(c) subjecting the valve metal foil to electrolytic polymerization of a polymerizable compound in an electrolytic solution by application of a polymerization potential between the electrode for electrolytic polymerization and a counter electrode placed in the electrolytic solution in a spaced relation with the electrode for electrolytic polymerization until a conductive polymer layer serving as a solid electrolyte is uniformly formed on the conductive inorganic layer;

(d) applying and curing at least conductive paste on the conductive polymer film to form at least one cured conductive paste film;

(e) removing the electrode for the electrolytic polymerization from the valve metal foil;

(f) applying an insulating film over the removed portion; and (g) attaching leads to the valve metal foil and the at least one cured conductive paste film, respectively.

18. A method according to claim 17, wherein said at least one cured conductive paste film has a double-layer structure of a cured carbon paste film and a cured silver paste film.

19. A method according to claim 17, wherein said at least one cured conductive paste film is a cured carbon paste film.

20. A method according to claim 17, wherein said at least one cured conductive paste film is a cured carbon paste film and, after the step (f), a silver paste is applied and cured on the cured carbon paste film.

21. A method according to claim 17, wherein said insulating film is made of at least one member selected from the group consisting of UV-cured resins, epoxy resins, polyimides, polyimide-amides and silicone rubbers.

22. A method for fabricating a solid electrolytic capacitor unit of the type which comprises at least two capacitor elements integrally combined together through a conductive polymer, each capacitor element including a valve metal foil capable of forming a dielectric oxide film thereon, a dielectric oxide film formed on the valve metal foil for except for a portion serving as an electrode for the capacitor, a conductive inorganic film formed on the dielectric oxide film, a conductive polymer film formed on the conductive inorganic film by electrolytic polymerization, and leads formed on the valve metal foils which are electrically connected each other through the electrode portions thereof and the conductive polymer film, the method comprising:

(a) providing at least two valve metal foils, each having a dielectric film and a conductive inorganic layer formed thereon in this order;

(b) contacting an electrode for electrolytic polymerization with part of at least one valve metal foil while electrically connecting at least two valve metal foils in a spaced relation to each other wherein the electrode is made of a material incapable of undergoing anodization in an electrolytic polymerization solution;

(c) subjecting the at least two valve metal foils to electrolytic polymerization of a polymerizable compound in an electrolytic solution by application of a polymerization potential between the electrode for electrolytic polymerization and a counter electrode placed in the electrolytic solution in a spaced relation with the electrode for electrolytic polymerization until a conductive polymer layer serving as a solid electrolyte is formed on the conductive inorganic layer of each valve metal foil; and (d) removing the electrode for the electrolytic polymerization from the valve metal foil and the electric connection between the at least two valve metal foils and attaching leads to one of the at least two valve metal foils which are electrically connected through the electrode portions thereof and the conductive polymer layer, respectively.

23. A method according to claim 22, wherein a separator is provided between the at least two valve metals to fix in the step (b).

24. A method according to claim 22, wherein the electrolytic polymerization solution comprises at least one member selected from the group consisting of pyrrole, thiophene and derivatives thereof and a support electrolyte.

25. A method according to claim 22, wherein said valve metal is aluminium or tantalum.

26. A method according to claim 22, wherein after the step (d), an insulating film is formed on the removed portion of the valve metal foil.

27. A method according to claim 26, wherein said insulating film is made of at least one member selected from the group consisting of UV-cured resins, epoxy resins, polyimides, polyimide-amides and silicone rubbers.

28. A method according to claim 22, further comprising forming at least one cured conductive paste film on the conductive polymer film wherein one of the leads is attached to the at least one cured conductive paste film instead of the conductive polymer film.

29. A method according to claim 28, wherein said at least one cured conductive paste film is a cured carbon paste film.

30. A method according to claim 28, wherein said at least one cured conductive paste film is a double-layer structure including a cured carbon paste film and a cured silver paste film.

* * * * *